US010230457B2

(12) United States Patent
Kitamura et al.

(10) Patent No.: US 10,230,457 B2
(45) Date of Patent: Mar. 12, 2019

(54) FRAMER AND FRAMING METHOD

(71) Applicant: NIPPON TELEGRAPH AND TELEPHONE CORPORATION, Tokyo (JP)

(72) Inventors: Kei Kitamura, Tokyo (JP); Takafumi Hamano, Tokyo (JP); Takashi Kotanigawa, Tokyo (JP); Kaoru Arai, Tokyo (JP); Masahiro Yokota, Tokyo (JP); Hideki Maeda, Tokyo (JP); Yoshiaki Yamada, Yokosuka (JP); Takuya Ohara, Yokosuka (JP); Kengo Shintaku, Yokosuka (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 15/526,835

(22) PCT Filed: Nov. 27, 2015

(86) PCT No.: PCT/JP2015/083466
§ 371 (c)(1),
(2) Date: May 15, 2017

(87) PCT Pub. No.: WO2016/084953
PCT Pub. Date: Jun. 2, 2016

(65) Prior Publication Data
US 2017/0324472 A1    Nov. 9, 2017

(30) Foreign Application Priority Data

Nov. 28, 2014  (JP) .................................. 2014-241494

(51) Int. Cl.
*H04B 10/032* (2013.01)
*H04J 3/16* (2006.01)
(Continued)

(52) U.S. Cl.
CPC ............. *H04B 10/032* (2013.01); *H04B 1/74* (2013.01); *H04B 10/03* (2013.01); *H04J 3/00* (2013.01); *H04J 3/14* (2013.01); *H04J 3/16* (2013.01)

(58) Field of Classification Search
CPC ................................ H04B 10/032; H04J 3/16
See application file for complete search history.

(56) References Cited

U.S. PATENT DOCUMENTS 5,452,115 A * 9/1995 Tomioka ............. H04J 14/0227
                                                         398/14
5,764,392 A * 6/1998 Van As ............. H04L 12/40006
                                                         370/460
(Continued)

FOREIGN PATENT DOCUMENTS

CN    101741466 A    6/2010
CN    103533464 A    1/2014
(Continued)

OTHER PUBLICATIONS

Bo Wen et al: "Routing, wavelength and time-slot-assignment algorithms for wavelength-routed optical WDM/TDM networks", Journal of Lightwave Technology., vol. 23, No. 9, Sep. 1, 2005 (Sep. 1, 2005), pp. 2598-2609, XP055451393.
(Continued)

*Primary Examiner* — Mina M Shalaby
(74) *Attorney, Agent, or Firm* — Harness, Dickey & Pierce, P.L.C.

(57) ABSTRACT

A framer in a transmission device allocates plural optical channel time slots to a plurality of logical prioritized paths. It allocates received client signals to the allocated time slots, and transmits the client signals by a plurality of optical subcarriers that use a plurality of optical wavelengths corresponding to the plurality of time slots. The framer includes: a time slot allocation unit that, in a case where an
(Continued)

optical wavelength corresponding to a time slot allocated to a logical path having a high transmission priority is not used, allocates at least one of the plurality of time slots to the logical path having the high transmission priority while the time slot corresponding to the unused optical wavelength is avoided, to change the time slot allocated to the logical path having the high transmission priority.

8 Claims, 11 Drawing Sheets

(51) Int. Cl.
*H04B 1/74* (2006.01)
*H04B 10/03* (2013.01)
*H04J 3/00* (2006.01)
*H04J 3/14* (2006.01)

(56) References Cited

U.S. PATENT DOCUMENTS

| | | |
|---|---|---|
| 2007/0258444 A1 | 11/2007 | He |
| 2008/0084898 A1* | 4/2008 | Miyaho .................. H04L 47/10 370/498 |
| 2009/0168797 A1* | 7/2009 | Danielson ............. H04J 3/1682 370/458 |
| 2010/0142947 A1 | 6/2010 | Shin et al. |
| 2011/0116803 A1* | 5/2011 | Sone .................. H04Q 11/0067 398/98 |
| 2013/0216217 A1* | 8/2013 | Sharma .................. H04J 14/08 398/8 |
| 2014/0308037 A1* | 10/2014 | Hu ...................... H04J 14/0257 398/47 |
| 2016/0056886 A1* | 2/2016 | Kitamura ........... H04Q 11/0062 398/5 |
| 2016/0197691 A1* | 7/2016 | Su ......................... H04J 3/1652 398/45 |
| 2016/0352452 A1* | 12/2016 | Takeshita ............ H04J 14/0267 |
| 2017/0257169 A1* | 9/2017 | Kitamura ................. H04J 14/08 |
| 2017/0324472 A1* | 11/2017 | Kitamura ............. H04B 10/032 |
| 2017/0339474 A1* | 11/2017 | Chen .................. H04Q 11/0066 |
| 2017/0366288 A1* | 12/2017 | Yokota .................. H04J 3/1652 |

FOREIGN PATENT DOCUMENTS

| | | |
|---|---|---|
| CN | 103997390 A | 8/2014 |
| EP | 2819362 A1 | 12/2014 |
| JP | 2007-524263 A | 8/2007 |
| JP | 2010-136380 A | 6/2010 |
| JP | 2012-004839 A | 1/2012 |
| WO | WO-2005/064983 A1 | 7/2005 |
| WO | WO-2013/125621 A1 | 8/2013 |

OTHER PUBLICATIONS

Extended European Search Report for corresponding application EP 15862214.2, EPO, Munich, dated Feb. 23, 2018.
Interfaces for the optical transport network, ITU-T G.709/Y.1331, Feb. 2012.
Takuya Ohara, OTN Interface Technologies and Standardization Trend, Proceedings of the 2014 IEICE General Conference 2, BI-5-1, SS-47-SS-48, Mar. 2014 with partial translation.
International Search Report for PCT/JP2015/083466, ISA/JP, dated Jan. 26, 2016, with English translation thereof.
Chinese Office Action in parallel application CN 201580064078.2, SIPO, Jiangsu, dated May 18, 2018, with English translation attached.
Notice of Allowance in parallel application JP 2016-561966, JPO, dated Sep. 25, 2018 with English translation attached.

* cited by examiner

FIG. 8

| LOGICAL PATH ID | PRIORITY | TRANSMISSION BAND | ALLOCATION TIME SLOT ID |
|---|---|---|---|
| LOGICAL PATH #1 | HIGH | 50Gbps | 1~5 |
| LOGICAL PATH #2 | LOW | 50Gbps | 6~10 |
| LOGICAL PATH #3 | HIGH | 200Gbps | 11~30 |
| LOGICAL PATH #4 | LOW | 100Gbps | 31~40 |
| LOGICAL PATH #5 | HIGH | 100Gbps | 41~50 |

FIG. 9

| DAMAGED TIME SLOT LIST |
|---|
| 21, 22, ..., 29, 30 |

FIG. 10

| DAMAGED LOGICAL PATH ID LIST |
|---|
| #3 |

FRAMER AND FRAMING METHOD

CROSS-REFERENCE TO RELATED APPLICATIONS

This application is a 371 U.S. National Stage of International Application No. PCT/JP2015/083466, filed Nov. 27, 2015, which claims the benefit of and priority to Japanese Patent Application No. 2014-241494, filed Nov. 28, 2014. The disclosures of the above applications are incorporated herein by reference.

TECHNICAL FIELD

The present invention relates to a framer and a framing method.

BACKGROUND ART

In an OTN (Optical Transport Network), which is a high-capacity broad area optical transport network, transfer is performed by accommodating a client signal by various standards, such as SDH (Synchronous Digital Hierarchy) or Ethernet (registered trademark). In recent years, there has been a marked increase in client signal traffic, and an accompanying standardization of OTNs to handle higher speeds has been advanced (for example, refer to Non-Patent Document 1). Further, an OTUCn (Optical channel Transport Unit-Cn, where Cn represents 100G×n), which is an OTN technique exceeding 100G (B100G, where G represents gigabits per second), is currently being investigated (for example, refer to Non-Patent Document 2). In an OTUCn, the transmission capacity of a single optical channel becomes more broadband than a conventional OTU. However, for reasons related to the operation speed of the electronic circuits used in optical signal transceivers, it is difficult to achieve a higher capacity by expanding single carrier transmission with respect to the band of a single optical channel in a conventional manner. Therefore, in an OTUCn, a higher capacity is realized by multicarrier transmission using a plurality of optical subcarriers in the band of a single optical channel.

PRIOR ART DOCUMENTS

Non-Patent Documents

[Non-Patent Document 1]"Interfaces for the optical transport network", ITU-T G.709/Y.1331, February 2012.
[Non-Patent Document 2] Takuya Ohara, "OTN Interface Technologies and Standardization Trend", Proceedings of the 2014 IEICE General Conference 2, BI-5-1, SS-47-SS-48, March 2014.

SUMMARY OF THE INVENTION

Problem to be Solved by the Invention

A framer used in an OTUCn performs multiplexing to set a plurality of client signals into a single ODUCn (ODU: Optical Channel Data Unit). The framer generates from the ODUCn, into which the client signals are set, an OTUCn (Optical channel Transport Unit-Cn) electric signal whose payload capacity n×100G. The framer interleaves the generated OTUCn electrical signal and generates n OTLCn.n (Optical channel Transport Lane-Cn.n) signals, which represent parallel signals whose payload capacity is 100G. The n parallel signals generated by the framer, which is the equivalent of a single optical channel, undergo multicarrier transmission by optical subcarriers that respectively utilize a plurality of optical wavelengths. In a case where damage occurs to a portion of the plurality of optical wavelengths, there is a possibility of transmission of a high-priority client signal transmitted using the optical wavelength in which damage occurred, becoming no longer possible.

In view of the circumstances described above, the present invention has an object of providing a framer and a framing method that, in a case where multicarrier transmission of a plurality of client signals is to be performed by a plurality of parallel signals, are able to perform transmission according to a transmission priority even if damage to a portion of the optical wavelengths, and the like, has occurred.

Means for Solving the Problem

A framer according to an aspect of the present invention is in a transmission device which allocates a plurality of logical paths each having a transmission priority to a plurality of time slots of an optical channel, allocates a plurality of client signals received by the plurality of logical paths to the plurality of time slots to which the plurality of logical paths is allocated, and transmits the plurality of client signals by a plurality of optical subcarriers that use a plurality of optical wavelengths corresponding to the plurality of time slots, and is a framer that includes: a time slot allocation unit that, in a case where an optical wavelength corresponding to a time slot to which a logical path having a high transmission priority is not used is allocated, allocates the logical path having the high transmission priority to at least one of the plurality of time slots while the time slot corresponding to the unused optical wavelength is avoided, to change the time slot to which to the logical path having the high transmission priority is allocated.

In the framer mentioned above, the time slot allocation unit may reallocate time slots such that allocation destination time slots are switched between the logical path allocated to the time slot corresponding to the unused optical wavelength, and a logical path which has a lower transmission priority than that of the logical path allocated to the time slot corresponding to the unused optical wavelength, and which is allocated to a time slot corresponding to a normal optical wavelength among the plurality of optical wavelengths.

In the framer mentioned above, the time slot allocation unit may change an allocation destination of the logical path allocated to the unused time slot corresponding to the unused optical wavelength, to a time slot which corresponds to a normal optical wavelength among the plurality of optical wavelengths and to which a logical path is not allocated.

In the framer mentioned above, the time slot allocation unit may change an allocation destination of the logical path allocated to the unused time slot corresponding to the unused optical wavelength, to a time slot which corresponds to a normal optical wavelength among the plurality of optical wavelengths, to which a logical path is not allocated and which is not set as unusable.

A framing method according an aspect of the present invention is performed by a framer in a transmission device which allocates a plurality of logical paths each having a transmission priority to a plurality of time slots of an optical channel to, allocates a plurality of client signals received by the plurality of logical paths to the plurality of time slots to which the plurality of logical paths is allocated, and transmits the plurality of client signals by a plurality of optical subcarriers that use a plurality of optical wavelengths corresponding to the plurality of time slots, and is a framing method including: a time slot allocation step of, in a case where an optical wavelength corresponding to a time slot to which to a logical path having a high transmission priority is not used is allocated, allocating the logical path having the high transmission priority to at least one of the plurality of time slots while the time slot corresponding to the unused optical wavelength is avoided, to change the time slot to which to the logical path having the high transmission priority is allocated.

In the framer method mentioned above, the time slot allocation step may include reallocating time slots such that allocation destination time slots are switched between the logical path allocated to the time slot corresponding to the unused optical wavelength, and a logical path which has a lower transmission priority than that of the logical path allocated to the time slot corresponding to the unused optical wavelength, and which is allocated to a time slot corresponding to a normal optical wavelength among the plurality of optical wavelengths.

In the framing method mentioned above, the time slot allocation step may include changing an allocation destination of the logical path allocated to the unused time slot corresponding to the unused optical wavelength, to a time slot which corresponds to a normal optical wavelength among the plurality of optical wavelengths and to which a logical path is not allocated.

In the framing method mentioned above, the time slot allocation step may include changing an allocation destination of the logical path allocated to the unused time slot corresponding to the unused optical wavelength, to a time slot which corresponds to a normal optical wavelength among the plurality of optical wavelengths, to which a logical path is not allocated and which is not set as unusable.

Effect of the Invention

The present invention allows transmission to be performed according to a transmission priority in a case where multicarrier transmission of a plurality of client signals is performed by a plurality of parallel signals, even if a portion of the optical wavelengths is not used.

BRIEF DESCRIPTION OF THE DRAWINGS

FIG. 8 is a diagram showing a table structure of a time slot allocation management table in the present embodiment.
FIG. 9 is a diagram showing a damaged time slot list received by a damage information reception unit shown in FIG. 6.
FIG. 10 is a diagram showing a configuration of a damaged logical path ID list generated by a list generation unit shown in FIG. 6.

EMBODIMENTS FOR CARRYING OUT THE INVENTION

Hereunder, embodiments of the present invention are described with reference to the drawings.

Figure 1:
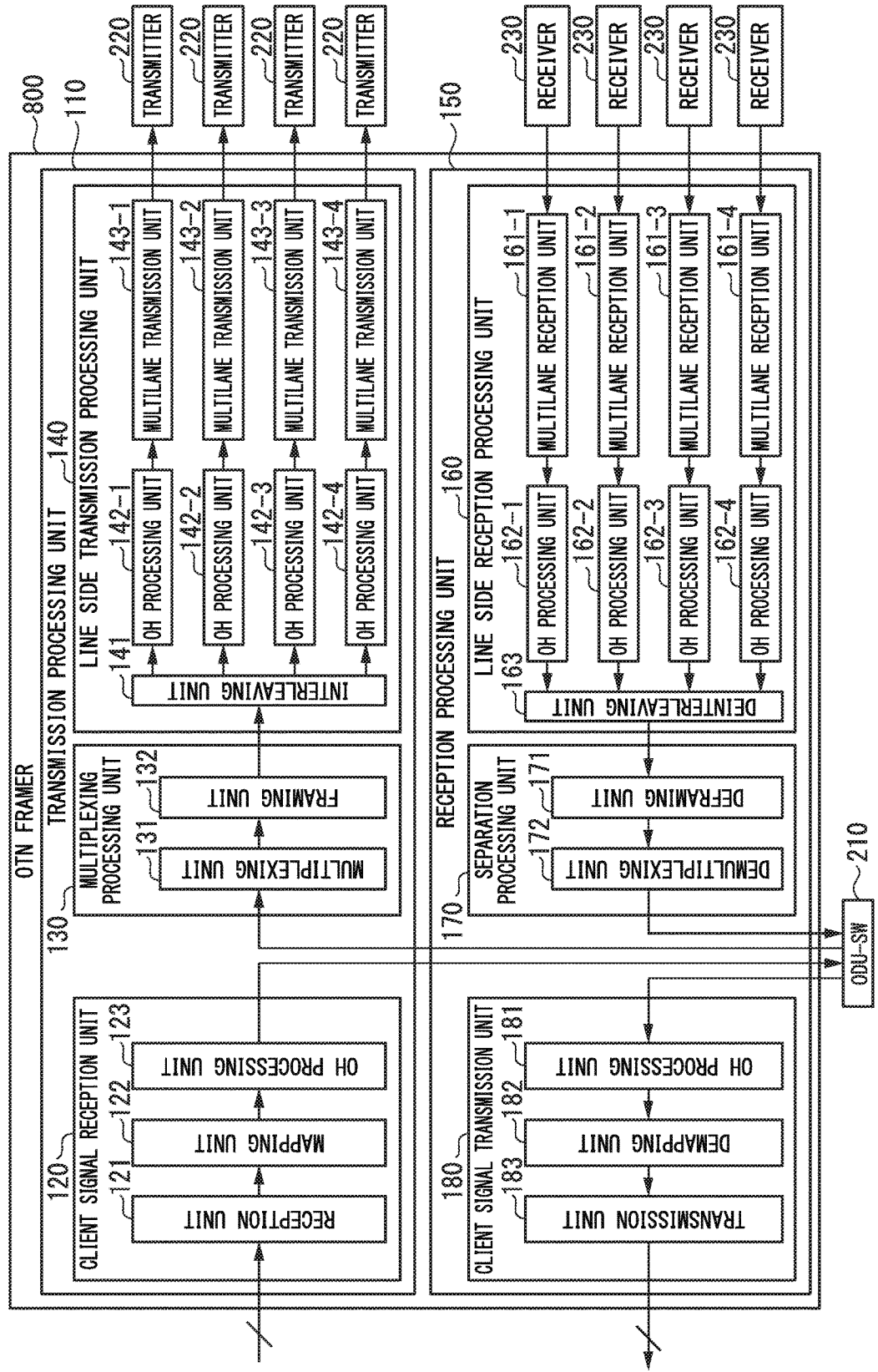
FIG. 1 is a block diagram showing a framer according to an embodiment of the present invention.

FIG. 1 is a function block diagram of an OTN framer 800 that is applicable to an embodiment of the present invention. The OTN framer 800 performs communication by means of OTUCn (where Cn represents 100G×n, and n is an integer of 2 or higher), which represents an OTN (Optical Transport Network) standard for performing transmissions exceeding 100G (B100G, where G represents gigabits per second). In FIG. 1, presented is an example of a case where n=4, that is to say, a case where the OTN framer 800 performs communication by means of OTUC4.

In OTN transport techniques, client signals according to various communication methods are accommodated and transferred by optical transmission. An OTN uses a fixed frame structure, and handles a client signal in 1.25G TS (Tributary Slot, also referred to as a time slot) units (that is to say, multiples thereof) by means of an ODUO (ODU: Optical Channel Data Unit), which is a minimum unit that is able to accommodate a GbE (gigabit Ethernet (registered trademark)). An OTN provides path management in the same manner as a SDH (Synchronous Digital Hierarchy), an OAM (Operations, Administration, Maintenance) functionality, and a protection functionality.

The OTN framer 800 separates a signal of a single n×100G optical channel, in which a plurality of client signals are multiplexed, and generates n 100G parallel signals. The n parallel signals undergo multi-carrier transfer by a plurality of optical subcarriers. Physically, a single parallel signal may be transferred by a single optical subcarrier, or a plurality of parallel signals may be transferred by a single optical subcarrier. Multi-carrier transfer represents a communication method that provides a high capacity to a single channel by performing parallel transfer of a signal of a single channel using a plurality of subcarriers (carrier waves). In multi-carrier transfer, subcarriers are high-density multiplexed for each ground (connection destination), and electrically separated. If a single parallel signal is transferred by a single optical subcarrier, the band of the optical subcarrier thereof is 100G. If two parallel signals are transferred by a single optical subcarrier, the band of the optical subcarrier thereof is 200G. Optical transfer uses a communication method such as 4SC-DP-QPSK (4 Subcarrier-Dual Polarization-Quadrature Phase Shift Keying) or 2SC-DP-16QAM (2 Subcarrier-Dual Polarization-Quadrature Amplitude Modulation).

As shown in FIG. 1, the OTN framer 800 includes a transmission processing unit 110 and a reception processing unit 150.

The transmission processing unit 110 includes a client signal reception unit 120, a multiplexing processing unit 130, and a line side transmission processing unit 140.

The client signal reception unit 120 includes a reception unit 121, a mapping unit 122, and an OH processing unit 123.

The reception unit 121 receives a client signal. The mapping unit 122 performs mapping of the single client signal received by the reception unit 121 to a LO ODU (Lower Order Optical Channel Data Unit) frame payload. The OH processing unit 123 adds an OH (overhead) to the LO ODU frame to which the client signal has been set by the mapping unit 122. The OH processing unit 123 outputs an electrical path signal of the LO ODU frame to an ODU-switch (referred to as "ODU-SW" below) 210. The ODU-SW 210 is also connected to another OTN framer 800, and performs path exchange of electrical path signals.

The multiplexing processing unit 130 includes a multiplexing unit 131 and a framing unit 132. The multiplexing unit 131 sets the electrical path signal received from the ODU-SW 210 to a LO ODU frame. Once the multiplexing unit 131 performs mapping of the LO ODU frame to an ODTU (Optical Channel Data Tributary Unit) frame, it then performs time-multiplexing of a plurality of ODTU frames and generates an ODUCn frame, which represents a HO ODU (Higher Order ODU). The framing unit 132 adds an OH and a FEC (Forward Error Correction) to the ODUCn frame generated by the multiplexing unit 131, and generates an OTUCn frame. The framing unit 132 outputs the OTUCn frame signal to the line side transmission processing unit 140.

The line side transmission processing unit 140 includes an interleaving unit 141, OH processing units 142-1 to 142-$n$, and multilane transmission units 143-1 to 143-$n$ (in the example presented in FIG. 1, "n=4" as mentioned above).

The interleaving unit 141 receives the OTUCn frame signal from the multiplexing processing unit 130, and byte-interleaves the received n×100G OTUCn frame signal to generate n OTLCn.n frame signals. An OTLCn.n frame is a 100G parallel signal frame. The ith OTLCn.n frame is referred to as the OTLCn.n #i frame (where i is an integer of 1 or more and n or less). The interleaving unit 141 outputs the respective generated n OTLCn.n #i frames to the OH processing units 142-$i$.

The OH processing units 142-1 to 142-$n$ set an OH to the OTLCn.n frames received from the interleaving unit 141. The OH processing units 142-$i$ output the OTLCn.n #i frames, to which an OH has been set, to the multilane transmission unit 143-$i$.

The multilane transmission units 143-1 to 143-$n$ output the parallel signals of the OTLCn.n frames received from the OH processing units 142-1 to 142-$n$ to transmitters 220. For example, the multilane transmission unit 143-$i$ uses four 28 G electrical wires to output the parallel signal of the OTLCn.n #i frames in parallel to the transmitters 220. The transmitters 220 use optical subcarriers each having different optical frequencies. The transmitters 220 convert the received parallel signal from an electrical signal to an optical signal, and performs multi-carrier transmission. The plurality of multilane transmission units 143-$i$ may also be connected to a single transmitter 220. In a case where j (where j is an integer of 2 or more and n or less) multilane transmission units 143-$i$ are connected to a single transmitter 220, the transmitter 220 thereof transmits j parallel signals by j×100 G optical subcarriers.

The reception processing unit 150 includes a line side reception processing unit 160, a separation processing unit 170, and a client signal transmission unit 180.

The line side reception processing unit 160 includes multilane reception units 161-1 to 161-$n$, OH processing units 162-1 to 162-$n$, and a deinterleaving unit 163.

The multilane reception units 161-1 to 161-$n$ receive an electrical signal obtained by converting the optical signal received by the receivers 230 as a result of multi-carrier transmission. The receivers 230 receive optical signals by means of optical subcarriers that each have different optical frequencies. The multilane reception units 161-$i$, for example, use four 28 G electrical wires to output the electrical signal received in parallel from the receivers 230 to the OH processing units 162-$i$.

The OH processing units 162-1 to 162-$n$ recognize from the received signal, the head of a frame based on a FAS (frame alignment signal) or a MFAS (multiframe alignment signal) set to the OH of the OTLCn.n frame. The OH processing unit 162-$i$, by detecting the head position, extracts the OTLCn.n #i frame from the received signal by compensating for a delay time difference, and outputs it to the deinterleaving unit 163.

The deinterleaving unit 163 deinterleaves the received OTLCn.n #1 frame to OTLCn.n #n frame received from the OH processing units 162-1 to 162-$n$, and generates a single OTUCn frame.

The separation processing unit 170 includes a deframing unit 171 and a demultiplexing unit 172.

The deframing unit 171 FEC decodes the OTUCn frame signal generated by the deinterleaving unit 163, and extracts from the decoded OTUCn frame an ODUCn frame, in which a LO ODU frame has been time-multiplexed, and outputs it to the demultiplexing unit 172.

The demultiplexing unit 172 extracts from the ODUCn frame signal extracted by the deframing unit 171, the LO ODU frame in which the respective client signals have been set, and outputs an electrical path signal of the LO ODU frame to the ODU-SW 210.

The client signal transmission unit 180 includes an OH processing unit 181, a demapping unit 182, and a transmission unit 183.

The OH processing unit 181 receives the electrical path signal from the ODU-SW 210, and decodes the LO ODU frame from the received electrical path signal. The OH processing unit 181 performs processing related to the OH with respect to the LO ODU frame, and outputs it to the demapping unit 182.

The demapping unit 182 receives the electrical path signal of the LO ODU frame from the OH processing unit 181, extracts the client signals from the received electrical path signal, and outputs them to the transmission unit 183.

The transmission unit 183 transmits the client signals extracted by the demapping unit 182.

The client signal reception unit 120 and the multiplexing processing unit 130 may be directly connected, rather than via the ODU-SW 210. In the same manner, the separation processing unit 170 and the client signal transmission unit 180 may be directly connected, rather than via the ODU-SW 210.

Figure 2:
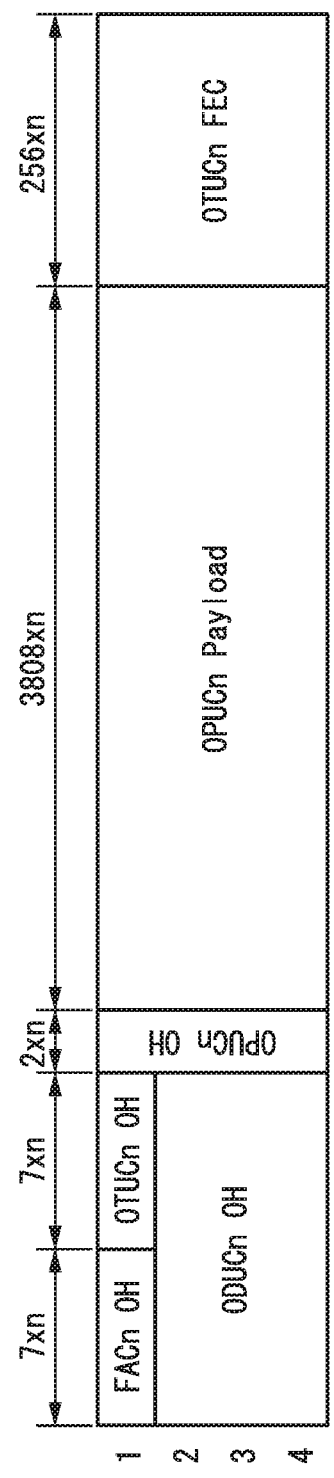
FIG. 2 is a diagram showing an OTUCn frame structure in the present embodiment.

FIG. 2 is a diagram showing an OTUCn frame structure.

An OTUCn is generated by adding a FACn OH, an OTUCn OH, an OPUCn OH, and an OTUCn FEC to an ODUCn. An OTUCn is represented by 4 rows and 4080×n columns.

Client signals are mapped to the OPUCn payload from the (16×n+1)th to 3824×nth column of the OTUCn. An OH is set to the 1st to 16×nth column of the OTUCn frame. A FACn OH is set to the 1st to 7×nth column of the first row. The FACn OH includes information that is necessary for frame synchronization.

In the (7×n+1)th to 14×nth column, an OTUCn OH is inserted that accommodates section monitoring information of the optical channel. In the 1st to 14×nth column of the second to fourth rows, an ODUCn OH is inserted that accommodates path management operation information of the optical channel. In the (14×n+1)th to 16×nth column, an OPUCn OH is inserted that accommodates information that is necessary for mapping/demapping of the client signal, and the like. A FEC parity check byte is added to the OTUCn FEC of the 3824×n+1th to 4080×nth columns. The FEC of the OTUCn frame may be omitted. Furthermore, the OTUCn FEC region is in no way limited to the region of the 3824×n+1th to 4080×nth columns, and may be changed to a region including an arbitrary number of bytes.

Figure 3:
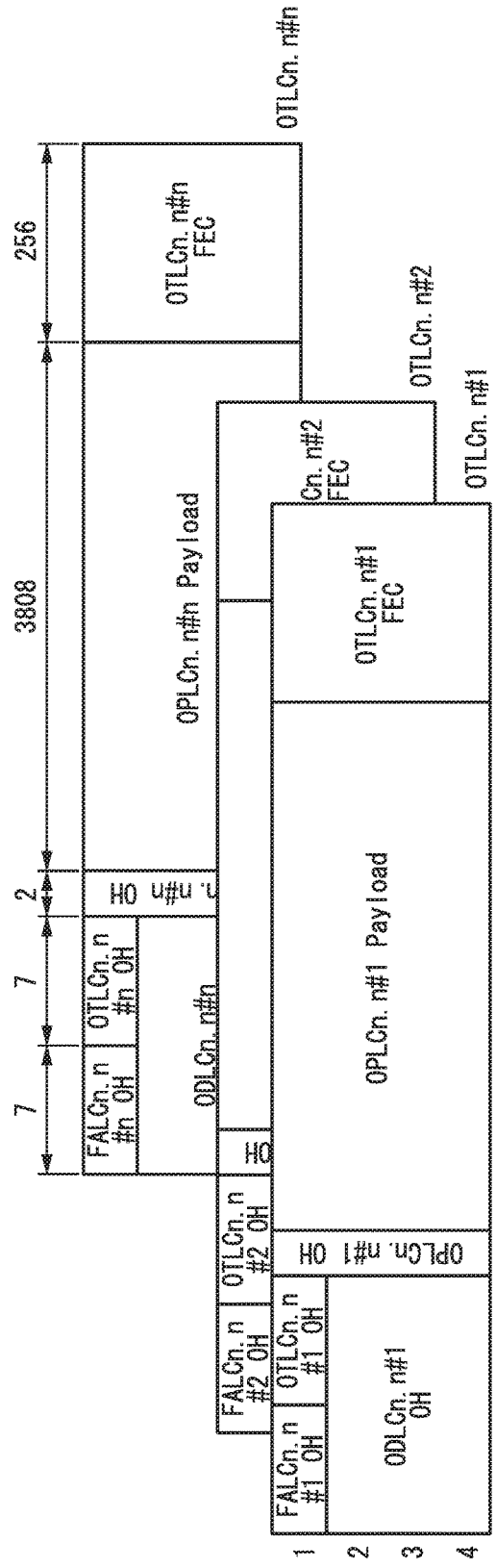
FIG. 3 is a diagram showing an OTLCn.n frame structure in the present embodiment.

FIG. 3 is a diagram showing an OTLCn.n frame structure.

An OTLCn.n is represented by 4 rows and 4080 columns. The OTLCn.n #1 to OTLCn.n #n are obtained by dividing an OTUCn frame by byte-interleaving.

An OPUCn payload of the OTUCn is mapped to an OPLCn.n #i payload of the 17th to 3824th column of the OTLCn.n #i.

An OH is set to the 1st to 16th column of the OTLCn.n #i. The OH of the OTLCn.n #i is set based on an OTUCn OH, and the like. A FALCn.n #i OH is set to the 1st to 7th column of the first row. The FALCn.n #i OH includes information that is necessary for frame synchronization, such as a FAS or a MFAS. In the 8th to 14th column of the first row, an OTLCn.n #i OH is inserted that accommodates section monitoring information of the optical channel. In the 1st to 14th column of the second to fourth rows, an ODLCn.n #i OH is inserted that accommodates path management operation information of the optical channel. In the 15th to 16th column, an OPLCn.n #i OH is inserted that accommodates information that is necessary for mapping/demapping of the client signal, and the like. A FEC parity check byte is added to the OTLCn.n #i FEC of the 3825th to 4080th column. The FEC of the OTLCn.n frame may be omitted. Furthermore, the OTLCn.n #i FEC region is in no way limited to the region of the 3825th to 4080th column, and may be changed to a region including an arbitrary number of bytes.

FIG. 4A to 4D are diagrams showing an optical channel used in the transmission of an optical signal.

Figure 4A:
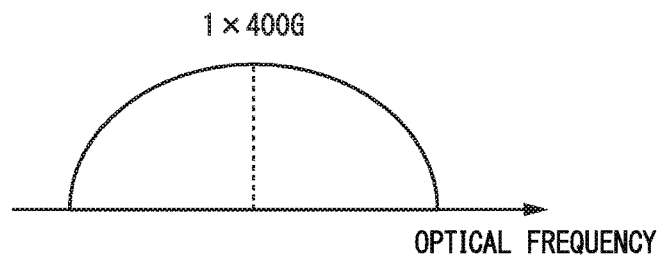
FIG. 4A is a diagram showing an example of an optical channel used in the transmission of an optical signal.
Figure 4B:
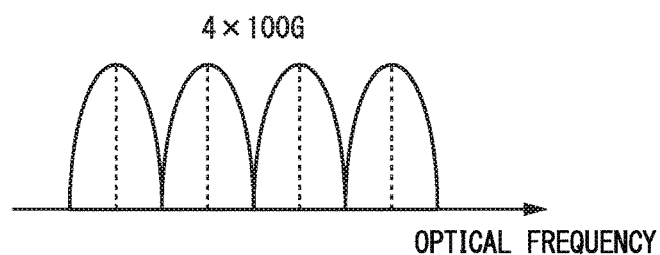
FIG. 4B is a diagram showing another example of an optical channel used in the transmission of an optical signal.

FIG. 4A is a diagram showing an optical channel in the case of serial transmission of a 400 G optical signal by a single optical frequency (single carrier). FIG. 4B is a diagram showing an optical channel in the case of parallel transmission (multicarrier transmission) of a 400 G optical signal by four optical subcarriers.

In conventional electronic circuits, as shown in FIG. 4A, it is difficult to continue to expand a band capable of performing serial transmission by a single frequency beyond 100 G due to restrictions in operation speed. Therefore, in OTUCn, broadband transmissions that are not affected by restrictions of the electronic circuit are realized by performing parallel transmission of a band exceeding 100 G by a plurality of optical subcarriers. The parallel transmission uses polarization multiplexing, multi-level modulation, and the like. The optical subcarrier band changes depending on the modulation method.

Figure 4C:
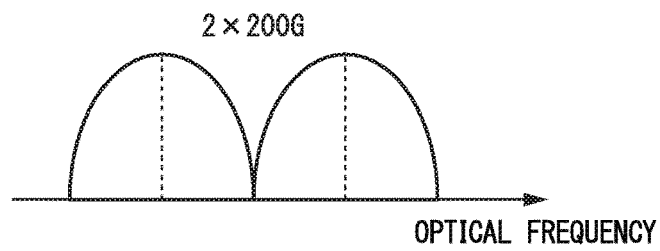
FIG. 4C is a diagram showing another example of an optical channel used in the transmission of an optical signal.
Figure 4D:
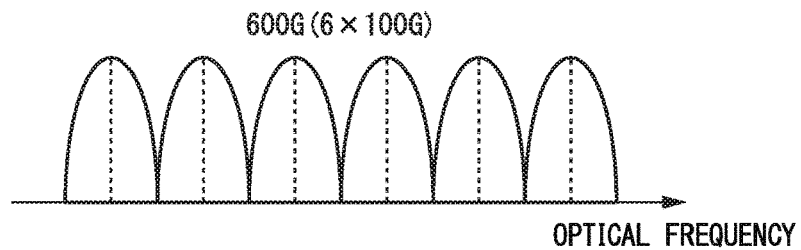
FIG. 4D is a diagram showing another example of an optical channel used in the transmission of an optical signal.

FIG. 4B is an example of a case where parallel transmission of a single 400 G optical channel is performed by four 100 G optical subcarriers. FIG. 4C is an example of a case where parallel transmission of a single 400 G optical channel is performed by two 200 G optical subcarriers. Furthermore, as shown in FIG. 4D, by changing n, a flexibility is provided that allows the transmission band to be increased by units of 100 G.

Figure 5:
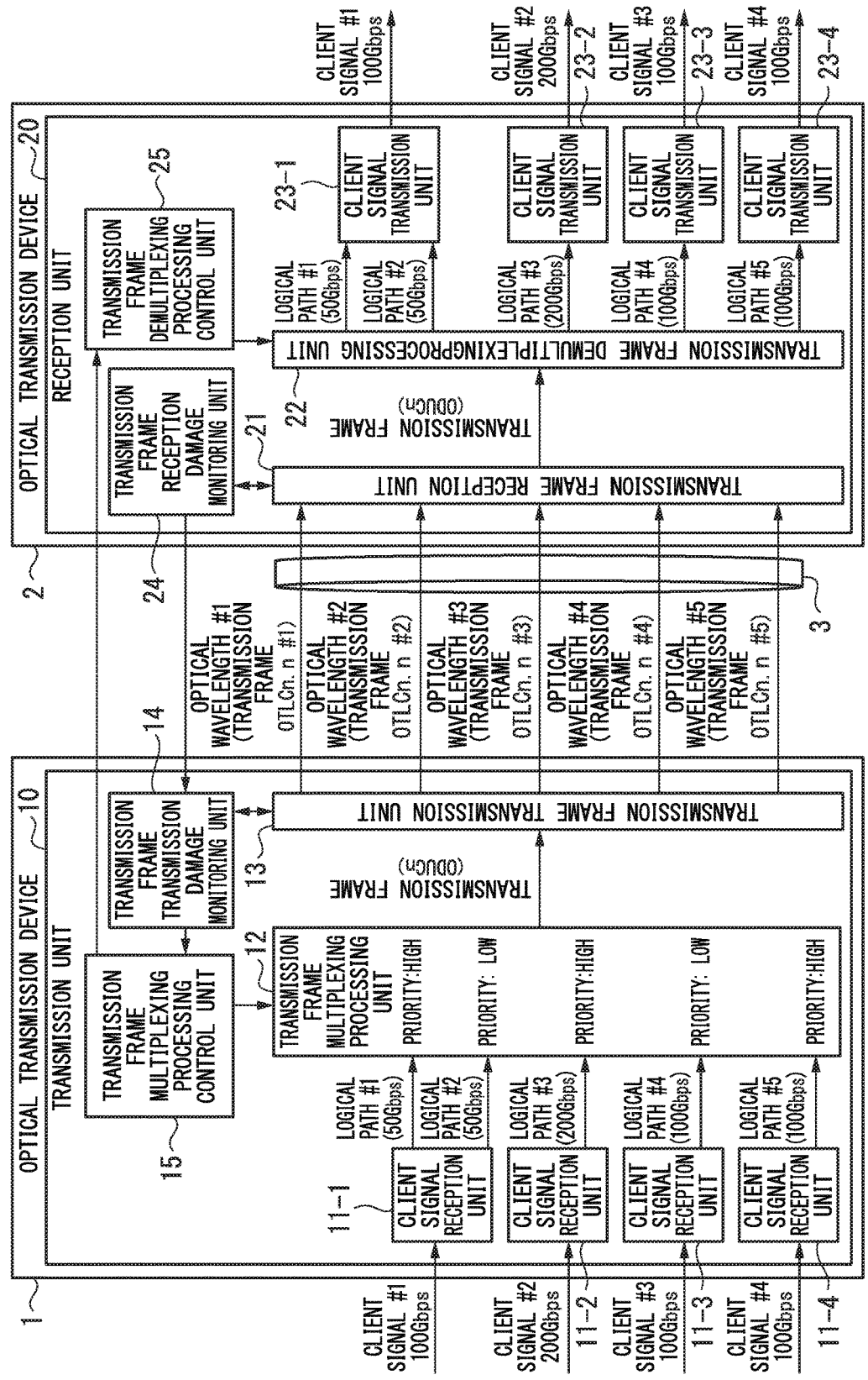
FIG. 5 is a block diagram showing a configuration of an optical channel transmission system according to an embodiment of the present invention.

Next, an optical channel transmission system according to an embodiment of the present invention is described with reference to FIG. 5. FIG. 5 is a block diagram showing a configuration of an optical channel transmission system according to the present embodiment. The optical channel transmission system is, as shown in FIG. 5, configured by a transmission side optical transmission device 1 and a reception side optical transmission device 2. The optical transmission device 1 includes a transmission unit 10. The optical transmission device 2 includes a reception unit 20. In the example shown in FIG. 5, the optical transmission device 1 includes just a single transmission unit 10. However, the present embodiment is in no way limited to such a configuration. The optical transmission device 1 may include a plurality of transmission units 10 that respectively use different optical channels. Furthermore, the optical transmission device 2 includes just a single reception unit 20. However, the present embodiment is in no way limited to such a configuration. The optical transmission device 2 may include a plurality of reception units 20 that respectively correspond to the same optical channels as the transmission units 10.

The transmission unit 10 is configured by a framer and a transmitter, and includes client signal reception units 11-1 to 11-4, a transmission frame multiplexing processing unit 12, a transmission frame transmission unit 13, a transmission frame transmission damage monitoring unit 14, and a transmission frame multiplexing processing control unit 15. The reception unit 20 is configured by a receiver and a framer, and includes a transmission frame reception unit 21, a transmission frame demultiplexing processing unit 22, client signal transmission units 23-1 to 23-4, a transmission frame reception damage monitoring unit 24, and a transmission frame demultiplexing processing control unit 25. The interval between the transmission unit 10 and the reception unit 20 is connected by a transmission path 3 that transmits the optical channels.

The client signal reception units 11-1 to 11-4 each have the same functionalities as the client signal reception unit 120 in FIG. 1. The client signal reception units 11-1 to 11-4 receive client signals such as from an Ethernet (registered trademark), generate logical path traffic, and transmit the logical path traffic with respect to the transmission frame multiplexing processing unit 12. The logical path traffic represents client signals set to a LO ODU frame. The generation of logical path traffic from client signals is carried out, for example, by distribution based on a VLAN (Virtual Local Area Network) tag of an Ethernet (registered trademark) and the like. In the example shown in FIG. 5, the client signal reception unit 11-1 receives a 100 Gbps (gigabit per second) client signal #1. Then, the client signal reception unit 11-1 generates two 50 Gbps logical paths #1 and #2. The logical paths are given a transmission priority (referred to as "priority" below). The logical path #1 is given a priority: "high", and the logical path #2 is given a priority: "low".

In the same manner, the client signal reception unit 11-2 receives a 200 Gbps client signal #2. Then, the client signal reception unit 11-2 generates a 200 Gbps logical path #3. Furthermore, the logical path #3 is given a priority: "high". The client signal reception unit 11-3 receives a 100 Gbps client signal #3. Then, the client signal reception unit 11-3 generates a 100 Gbps logical path #4. Moreover, the logical path #4 is given a priority: "low". The client signal reception unit 11-4 receives a 100 Gbps client signal #4. Then, the client signal reception unit 11-4 generates a 100 Gbps logical path #5. Furthermore, the logical path #5 is given a priority: "high". A logical path #k represents a logical path having a logical path ID of "#k".

The transmission frame multiplexing processing unit 12 has the same functionality as the multiplexing unit 131 in FIG. 1. The transmission frame multiplexing processing unit 12 multiplexes a plurality of received logical path traffic, and generates an ODUCn representing a transmission frame that configures the optical channel. The transmission frame multiplexing processing unit 12 transmits the generated transmission frame to the transmission frame transmission unit 13. The optical channel is divided into a plurality of time slots by time division multiplexing. Multiplexing of a plurality of logical path traffic is realized by allocating each pieces of the logical path traffic to the time slots. An example of the realization thereof is an ODU multiplexing method using an ODTU frame as prescribed by ITU-T (International Telecommunication Union Telecommunication Standardization Sector) G.709.

The transmission frame transmission unit 13 has the same functionality as the framing unit 132, the line side transmission processing unit 140, and the transmitter 220 in FIG. 1. The transmission frame transmission unit 13 divides the received transmission frame into transmission frames OTLCn.n #1 to #n. Further, the transmission frame transmission unit 13 transmits, for multicarrier transmission using a plurality of optical subcarriers, a parallel signal of the transmission frames OTLCn.n #1 to #n by a plurality of optical wavelengths with respect to the transmission path 3. The optical wavelengths of the optical subcarriers used in the optical transmission are determined beforehand for the time slot units. In the optical wavelength #1, a parallel signal of the transmission frame OTLCn.n #1, the transmission frame OTLCn.n #2, the transmission frame OTLCn.n #3, the transmission frame OTLCn.n #4, and the transmission frame OTLCn.n #5 is transmitted with respect to the transmission path 3.

The transmission frame reception unit 21 has the same functionality as the receiver 230, the line side reception processing unit 160, and the deframing unit 171 in FIG. 1. The transmission frame reception unit 21 restores the transmission frame by performing the reverse operation to that of the transmission frame transmission unit 13, and outputs it to the transmission frame demultiplexing processing unit 22.

The transmission frame demultiplexing processing unit 22 has the same functionality as the demultiplexing unit 172 in FIG. 1. The transmission frame demultiplexing processing unit 22 outputs the client signal by means of the logical paths #1 to #5 by performing the reverse operation to that of the transmission frame multiplexing processing unit 12. The transmission frame demultiplexing processing unit 22 outputs the 50 Gbps logical path #1 and the 50 Gbps logical path #2 with respect to the client signal transmission unit 23-1. The transmission frame demultiplexing processing unit 22 outputs the 200 Gbps logical path #3 with respect to the client signal transmission unit 23-2. The transmission frame demultiplexing processing unit 22 outputs the 100 Gbps logical path #4 with respect to the client signal transmission unit 23-3. The transmission frame demultiplexing processing unit 22 outputs the 100 Gbps logical path #5 with respect to the client signal transmission unit 23-4.

The client signal transmission units 23-1 to 23-4 have the same functionality as the client signal transmission unit 180 in FIG. 1. The client signal transmission unit 23-1 receives inputs of the two 50 Gbps logical paths #1 and #2, and outputs the 100 Gbps client signal #1 by means of the reverse operation to that of the client signal reception unit 11-1. The client signal transmission unit 23-2 receives the input of the 200 Gbps logical path #3, and outputs the 200 Gbps client signal #2 by means of the reverse operation to that of the client signal reception unit 11-2. The client signal transmission unit 23-3 receives the input of the 100 Gbps logical path #4, and outputs the 100 Gbps client signal #3 by means of the reverse operation to that of the client signal reception unit 11-3. The client signal transmission unit 23-4 receives the input of the 100 Gbps logical path #5, and outputs the 100 Gbps client signal #4 by means of the reverse operation to that of the client signal reception unit 11-4.

The transmission frame reception damage monitoring unit 24 monitors damage to the transmission frame reception unit 21. In a case where it is detected that damage has occurred to a received optical wavelength, the transmission frame reception damage monitoring unit 24 notifies the damage information to the transmission frame transmission damage monitoring unit 14.

For example, in a case where the transmission frame reception damage monitoring unit 24 is unable to receive a signal having a specific optical wavelength, it detects that damage has occurred to the optical wavelength thereof. Furthermore, for example, in a case where the transmission frame reception damage monitoring unit 24 detects that damage has occurred to a physical port, it detects that damage has occurred to the optical wavelength used for reception by the physical port thereof. The damage information indicates a damaged time slot representing the time slot that is affected by the damage to the optical wavelength.

The transmission frame transmission damage monitoring unit 14 monitors damage to the transmission frame transmission unit 13. In a case where it is detected that damage has occurred to a transmitted optical wavelength, the transmission frame transmission damage monitoring unit 14 notifies the transmission frame multiplexing processing control unit 15 of damage information indicating the damaged time slot that is affected by the damage to the optical wavelength thereof. For example, in a case where the transmission frame transmission damage monitoring unit 14 detects that damage has occurred to a physical port, it detects that damage has occurred to the optical wavelength used for transmission by the physical port thereof. Furthermore, in a case where damage information is received from the transmission frame reception damage monitoring unit 24, the damage information is notified to the transmission frame multiplexing processing control unit 15. Consequently, in a case where it is detected that damage has occurred to the optical wavelength in either the transmission frame transmission unit 13 or the transmission frame reception unit 21, the transmission frame multiplexing processing control unit 15 can acquire information of the damaged time slot that is affected by the damage to the optical wavelength thereof.

The transmission frame multiplexing processing control unit 15 instructs the transmission frame multiplexing processing unit 12, which logical path traffic is to be mapped to which time slot. Furthermore, the transmission frame multiplexing processing control unit 15 notifies the information thereof to the transmission frame demultiplexing processing control unit 25. When the transmission frame multiplexing processing control unit 15 receives damage information indicating the damaged time slot from the transmission frame transmission damage monitoring unit 14, it changes the mapping state of the logical path traffic to the time slots based on the damage information thereof. The transmission frame multiplexing processing control unit 15 instructs the content of the change thereof to the transmission frame multiplexing processing unit 12, and also notifies the information indicating the content of the change thereof to the transmission frame demultiplexing processing control unit 25.

The transmission frame demultiplexing processing control unit 25, based on the information received from the transmission frame multiplexing processing control unit 15, notifies the transmission frame demultiplexing processing unit 22 which logical path traffic is mapped to which time slot.

Figure 6:
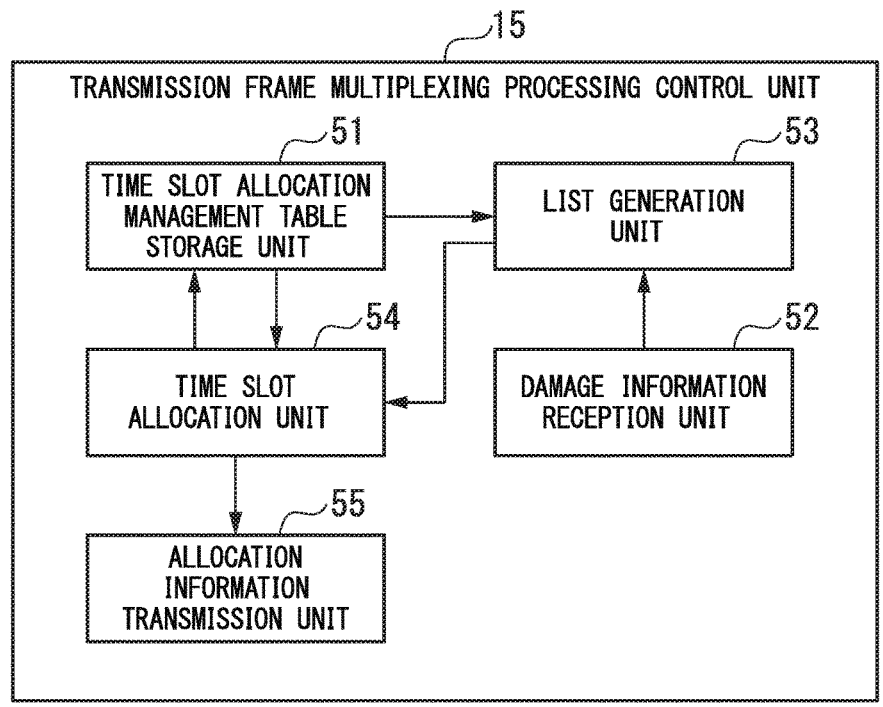
FIG. 6 is a block diagram showing a transmission frame multiplexing processing control unit shown in FIG. 5.

Next, a detailed configuration of the transmission frame multiplexing processing control unit 15 shown in FIG. 5 is described with reference to FIG. 6. FIG. 6 is a block diagram showing a detailed configuration of the transmission frame multiplexing processing control unit 15 shown in FIG. 5. As shown in FIG. 6, the transmission frame multiplexing processing control unit 15 includes a time slot allocation management table storage unit 51, a damage information reception unit 52, a list generation unit 53, a time slot allocation unit 54, and an allocation information transmission unit 55.

The time slot allocation management table storage unit 51 stores a time slot allocation management table that manages the allocation state of logical paths to time slots. The damage information reception unit 52 receives damage information transmitted from the transmission frame transmission damage monitoring unit 14 or the transmission frame reception damage monitoring unit 24. The list generation unit 53 generates list information necessary for performing allocation of time slots from the collected information. The time slot allocation unit 54 refers to the list information generated by the list generation unit 53, and allocates time slots by changing the mapping state of the time slots. Further, the time slot allocation unit 54, based on the result of performing the allocation, updates the time slot allocation management table stored in the time slot allocation management table storage unit 51. The allocation information transmission unit 55 transmits mapping state information of the time slots to the transmission frame multiplexing processing unit 12 and the transmission frame demultiplexing processing control unit 25.

Figure 7:
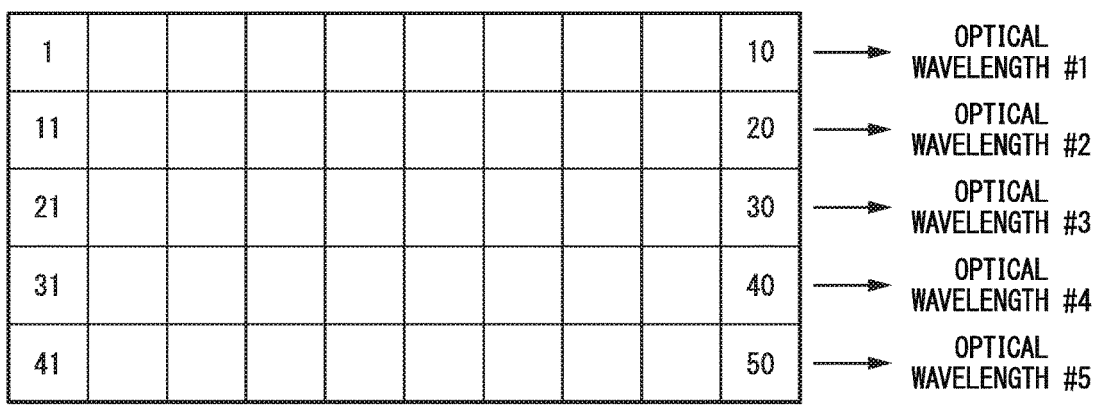
FIG. 7 is a diagram showing a time slot configuration of a transmission frame in the present embodiment.

Next, a time slot configuration of a transmission frame (ODUCn) is described with reference to FIG. 7. FIG. 7 is a diagram showing a time slot configuration of a transmission frame. Here, a case where the optical channel #1 as a whole has a 500 Gbps band (data transfer rate) is described. In FIG. 7, 100 Gbps is represented by ten time slots for simplicity.

The smallest squares shown in FIG. 7 represent time slots. The respective time slots are given time slot IDs of 1 to 50. Further, time slots having time slot IDs of 1 to 10 are allocated to the optical wavelength #1. In the same manner, time slots having time slot IDs of 11 to 20 are allocated to the optical wavelength #2. Furthermore, time slots having time slot IDs of 21 to 30 are allocated to the optical wavelength #3. Moreover, time slots having time slot IDs of 31 to 40 are allocated to the optical wavelength #4. Furthermore, time slots having time slot IDs of 41 to 50 are allocated to the optical wavelength #5. A client signal mapped to a time slot allocated to the optical wavelength #i is transmitted by means of a parallel signal of a transmission frame OTLCn.n #i, by an optical subcarrier having the optical wavelength #i. The time slots shown in FIG. 7 represent an example where the number of slots is 50. However, the number of slots is in no way limited to this. The number of time slots may exceed 50.

The division with respect to the time slots is performed for each optical channel.

Next, a table structure of a time slot allocation management table stored in the time slot allocation management table storage unit 51 shown in FIG. 6 is described with reference to FIG. 8. FIG. 8 is a diagram showing a table structure of a time slot allocation management table. Here, a case where the optical channel #1 as a whole has a 500 Gbps band (data transfer rate) is described. The time slot allocation management table represents data including records in which the fields "logical path ID", "priority", "transmission band", and "allocation time slot ID" are associated. The "logical path ID" field stores a logical path ID. The "priority" field stores a priority of the associated logical path. The priority is stored as either "high", which indicates that the priority is high, or "low", which indicates that the priority is low. The "transmission band" field stores a transmission band value of the associated logical path. The "allocation time slot ID" field stores the time slot ID (in this example, an ID of 1 to 50) to which the associated logical path is allocated. The logical path is allocated a number of time slots corresponding to the band of the logical path thereof, by the time slot allocation unit 54. The "allocation time slot ID" field does not store time slot IDs in which allocation has not been performed.

Next, a configuration of a damaged time slot list received by the damage information reception unit 52 shown in FIG. 6 is described with reference to FIG. 9. FIG. 9 is a diagram showing a damaged time slot list received by the damage information reception unit 52 shown in FIG. 6. A damaged time slot list is an example of damage information transmitted from the transmission frame transmission damage monitoring unit 14 or the transmission frame reception damage monitoring unit 24, and represents list information in which time slot IDs of damaged time slots, which are time slots which are affected by damage to an optical wavelength, are listed. In the example shown in FIG. 9, it is shown that damage exists for the time slots having time slot IDs of 21, 22, 23, 24, 25, 26, 27, 28, 29 and 30. The time slots in which damage exists represent the time slots corresponding to an optical wavelength in which damage has occurred. The optical wavelength in which damage has occurred is an example of an unused optical wavelength.

Next, a configuration of a damaged logical path ID list generated by the list generation unit 53 shown in FIG. 6 is described with reference to FIG. 10. FIG. 10 is a diagram showing a configuration of a damage local path ID list generated by the list generation unit 53 shown in FIG. 6. A damaged logical path ID list is generated as a result of the list generation unit 53 referring to the time slot allocation management table and the damaged time slot list. The list generation unit 53 specifies the logical path ID representing the allocation destination of the damaged time slot, and generates the damaged logical path ID list by listing the specified logical path ID. The example presented in FIG. 10 shows that damage has occurred to the logical path having a logical path ID of #3. A logical path in which damage has occurred is also described as a damaged logical path.

Figure 11:
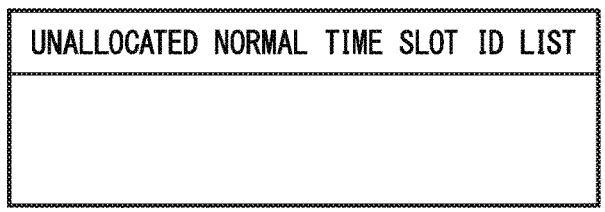
FIG. 11 is a diagram showing a configuration of an unallocated normal time slot ID list generated by the list generation unit shown in FIG. 6.

Next, a configuration of an unallocated normal time slot ID list generated by the list generation unit 53 shown in FIG. 6 is described with reference to FIG. 11. FIG. 11 is a diagram showing a configuration of an unallocated normal time slot ID list generated by the list generation unit 53 shown in FIG. 6. An unallocated normal time slot ID list is generated as a result of the list generation unit 53 referring to the time slot allocation management table and the damaged time slot list. An unallocated normal time slot ID list represents list information that lists the time slot IDs of, among the time slots not included in the damaged time slot list, unallocated normal time slots representing the time slots in which a logical path has not been allocated (empty time slot). The example presented in FIG. 11 shows that there are no unallocated normal time slots at the current time. If an unallocated normal time slot exists, then the time slot ID thereof is listed in the list.

Figure 12:
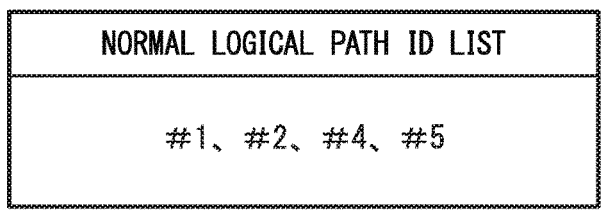
FIG. 12 is a diagram showing a configuration of a normal logical path ID list generated by the list generation unit shown in FIG. 6.

Next, a configuration of a normal logical path ID list generated by the list generation unit 53 shown in FIG. 6 is described with reference to FIG. 12. FIG. 12 is a diagram showing a configuration of a normal logical path ID list generated by the list generation unit 53 shown in FIG. 6. A normal logical path ID list is generated as a result of the list generation unit 53 referring to the time slot allocation management table and the damaged time slot list. A normal logical path ID list represents list information that lists the logical path (normal logical path) IDs that have not been allocated to a time slot included in the damaged time slot list. The example presented in FIG. 12 shows that the logical paths with logical path IDs of #1, #2, #4, and #5 are normal.

Figure 13:
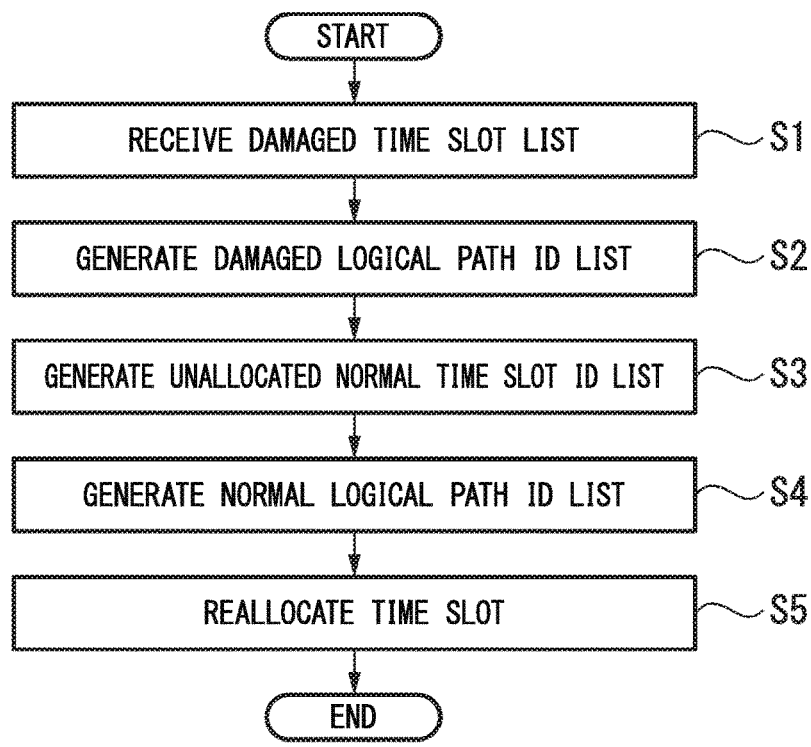
FIG. 13 is a flowchart showing a processing operation of a transmission frame multiplexing processing control unit shown in FIG. 6.

Next, a processing operation of the transmission frame multiplexing processing control unit 15 shown in FIG. 6 is described with reference to FIG. 13. FIG. 13 is a flowchart showing a processing operation of the transmission frame multiplexing processing control unit 15 shown in FIG. 6. Firstly, the damage information reception unit 52 receives the damaged time slot list from the transmission frame transmission damage monitoring unit 14 or the transmission frame reception damage monitoring unit 24 (step S1). The damage information reception unit 52 outputs the received damaged time slot list to the list generation unit 53.

Then, the list generation unit 53 generates a damaged logical path ID list (refer to FIG. 10), which represents a list of damaged logical paths that have been allocated a time slot included in the damaged time slot list (refer to FIG. 9) (step S2). The list generation unit 53 specifies the record in which the damaged time slot ID listed in the damaged time slot list has been set to the allocation time slot ID in the time slot allocation management table (refer to FIG. 8), and reads out the logical path ID of the specified record. Consequently, the list generation unit 53 specifies the ID of the logical path that includes the damaged time slot as an allocation destination, and generates the damaged logical path ID list by listing the specified logical path ID.

Next, the list generation unit 53 generates an unallocated normal time slot ID list (refer to FIG. 11), which represents, among normal time slots not included in the damaged time slot list, a list of empty time slots that have not been allocated a logical path (step S3). The list generation unit 53 obtains the unallocated normal time slot IDs by removing from all time slot IDs, the time slot IDs set in the damaged time slot list and the time slot IDs that have been set as allocation time slot IDs in the time slot allocation management table. The list generation unit 53 generates an unallocated normal time slot ID list in which the obtained unallocated normal time slot IDs have been set.

Here, a generation method of the unallocated normal time slot ID list in a case where a time slot set as unusable is present, is described. In this case, the list generation unit 53 obtains the unallocated normal time slot IDs by removing from all time slot IDs, the time slot IDs set in the time slot list, the time slot IDs that have been set as allocation time slot IDs in the time slot allocation management table, and the time slot IDs that have been set as unusable. The list generation unit 53 generates an unallocated normal time slot ID list in which the obtained unallocated normal time slot IDs have been set.

A time slot set as unusable represents a time slot included in an unusable region. A time slot set as unusable represents, for example, a time slot whose availability has been set as unusable.

Then, the list generation unit 53 generates a normal logical path ID list (refer to FIG. 12), which represents a list of normal logical path IDs that have not been allocated to a damaged time slot included in the damaged time slot list (step S4). The list generation unit 53, among the records in the time slot allocation management table, specifies the records that do not contain a time slot ID set in the damaged time slot list, as the allocation time slot ID. The list generation unit 53 reads out the logical path IDs from the specified records in the time slot allocation management table, and generates a normal logical path ID list in which the logical path IDs that were read out are set. The list generation unit 53 outputs the generated lists to the time slot allocation unit 54.

In response, the time slot allocation unit 54 refers to the time slot allocation management table and the respective list information to perform reallocation of the time slots (step S5). The time slot allocation unit 54 performs reallocation of the time slots by executing either a first or a second reallocation process as described below, and updates the time slot allocation management table stored in the time slot allocation management table storage unit 51. In response, the allocation information transmission unit 55 transmits the time slot reallocation result information to the transmission frame multiplexing processing unit 12 and the transmission frame demultiplexing processing control unit 25.

The first reallocation process performs reallocation of a time slot in a case where a normal logical path with a lower priority than a damaged logical path included in the damaged logical path ID list is included in the normal logical path ID list, such that the time slot representing the allocation destination of the low-priority normal logical path and the time slot representing the allocation destination of the damaged logical path, which currently has the damaged time slot as the allocation destination, are switched.

That is to say, the time slot allocation unit 54 specifies a record in the time slot allocation management table by means of the damaged logical path ID set in the damaged logical path ID list, and reads out the priority of the damaged logical path from the specified record. Further, the time slot allocation unit 54 specifies a record in the time slot allocation management table by means of the normal logical path ID set in the normal logical path ID list, and reads out the priority of the normal logical path from the specified record. The time slot allocation unit 54 compares the priorities that were read out, and determines whether or not a normal logical path with a lower priority than the damaged logical path is included in the normal logical path ID list. If a normal logical path with a lower priority than the damaged logical path exists, the time slot allocation unit 54 performs reallocation of the time slots such that the time slot representing the allocation destination of the low-priority normal logical path and the time slot representing the allocation destination of the damaged logical path, are switched.

The second reallocation process performs reallocation of a time slot in a case where a normal logical path with a lower priority than a damaged logical path included in the damaged logical path ID list is included in the normal logical path ID list, such that the time slot representing the allocation destination of the low-priority normal logical path, the time slot representing the allocation destination of the damaged logical path, and an unallocated normal time slot whose ID is set in the unallocated normal time slot ID list, are switched between the three.

That is to say, in the same manner as the first reallocation process, the time slot allocation unit 54 reads out the priority of the damaged logical path whose ID is set in the damaged logical path ID list and the priority of the normal logical path whose ID is set in the normal logical path ID list from the time slot allocation management table, and compares them. If a normal logical path with a lower priority than the damaged logical path exists, the time slot allocation unit 54 changes the time slot representing the allocation destination of the damaged logical path to an unallocated normal time slot whose ID is set in the unallocated normal time slot ID list. If there are no longer any damaged time slots among the time slots representing the allocation destinations of the damaged logical paths as a result of the change, reallocation is completed. If all of the damaged time slots representing allocation destinations of the damaged logical paths could not be changed to unallocated normal time slots even after changing the allocation destination time slots, a reallocation process in the same manner as the first reallocation process is further performed. That is to say, the time slot allocation unit 54 performs reallocation of the time slots such that the damaged time slot that could not be changed to an unallocated normal time slot among the allocation destinations of the damaged logical path and the time slot representing the allocation destination of a low-priority normal event logical path, are switched.

The transmission frame multiplexing processing unit 12, according to the time slot reallocation result information received from the transmission frame multiplexing processing control unit 15, sets the client signal received from the respective logical paths to an ODUCn time slot. The transmission frame demultiplexing processing control unit 25, based on the time slot reallocation result information received from the transmission frame multiplexing processing control unit 15, rewrites the time slot allocation management table used by the reception unit 20, and outputs the time slot reallocation result information to the transmission frame demultiplexing processing unit 22. The transmission frame demultiplexing processing unit 22 extracts the client signals of the logical paths from the ODUCn according to the information received from the transmission frame demultiplexing processing control unit 25.

Figure 14:
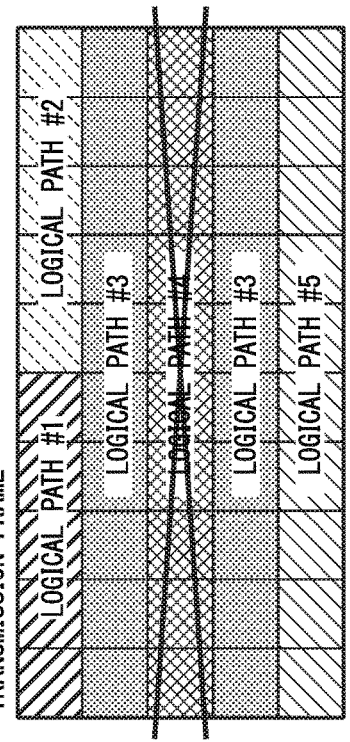
FIG. 14 is a diagram showing a mapping process of logical path traffic to time slots in the present embodiment.
Figure 14:
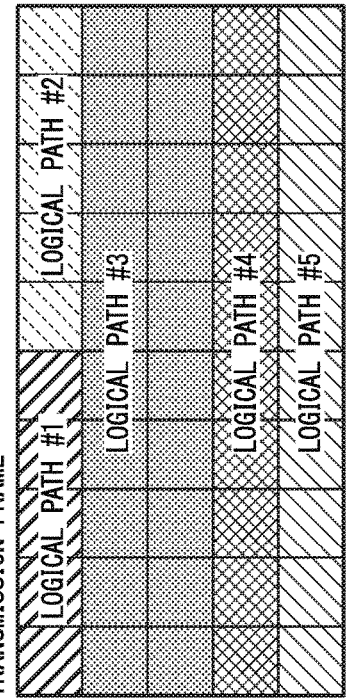
Figure 15:
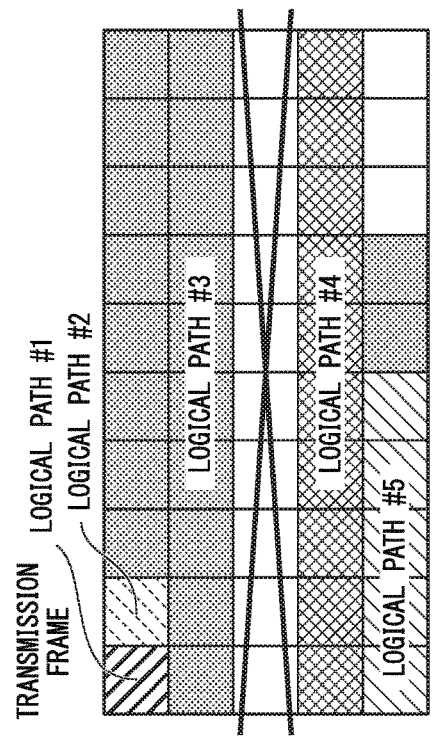
FIG. 15 is a diagram showing another example of a mapping process of logical path traffic to time slots in the present embodiment.
Figure 15:
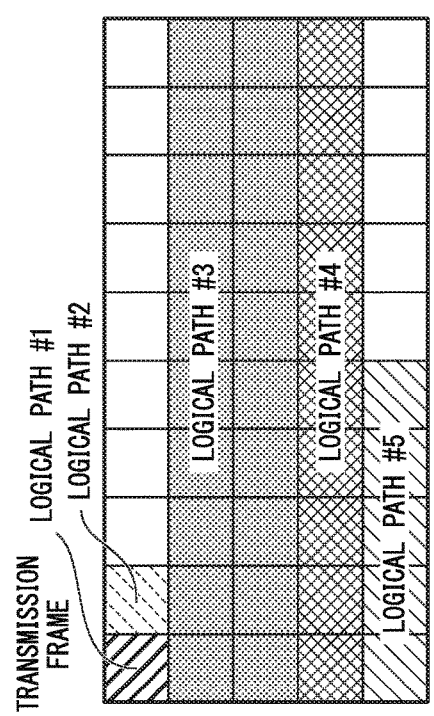
Figure 16:
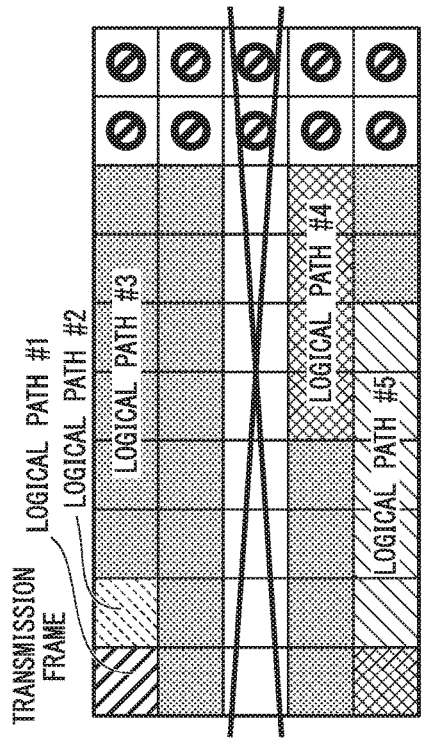
FIG. 16 is a diagram showing yet another example of a mapping process of logical path traffic to time slots in the present embodiment.
Figure 16:
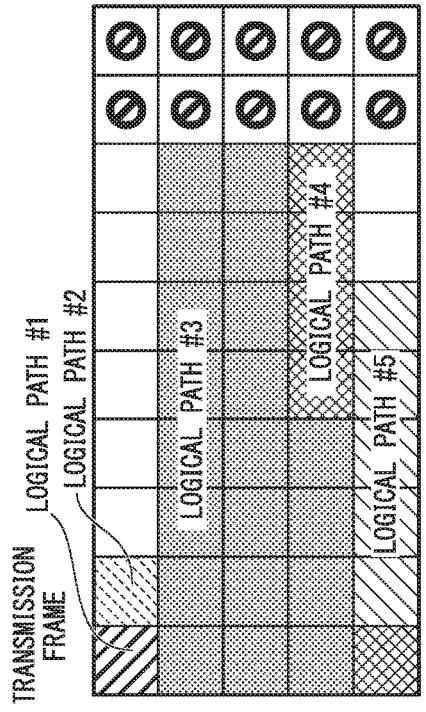

Here, operation of the first reallocation process and the second reallocation process is described by way of specific examples with reference to FIG. 14, FIG. 15, and FIG. 16.

Firstly, the first reallocation process is described with reference to FIG. 14. FIG. 14 is a diagram showing a mapping process of logical path traffic to time slots. Firstly, as an initial state, the time slot allocation unit 54 performs a time slot allocation process with respect to the 500 Gbps optical channel #1 by packing the logical paths #1 to #5 in order from the lowest number time slot, and the like. Then, the time slot allocation unit 54 generates the time slot allocation management table of the initial state presented in the diagram shown on the upper left in FIG. 14, and registers it in the time slot allocation management table storage unit. The diagram displayed on the lower left in FIG. 14 shows the time slot allocation of the logical paths #1 to #5 in an initial state. The time slots are specified by IDs of 1 to 50.

The damage information reception unit 52 of the transmission frame multiplexing processing control unit 15 acquires the damaged time slot list {21, 22, 23, 24, 25, 26, 27, 28, 29, 30} (refer to FIG. 9) (step S1).

The list generation unit 53 specifies a record in which a damaged time slot ID listed in the damaged time slot list has been set to the allocation time slot ID in the time slot allocation management table. The list generation unit 53 generates the damaged logical path ID list {#3} (refer to FIG. 10) in which the logical path ID read out from the specified record is set (step S2).

The list generation unit 53 removes from all time slot IDs 1 to 50, the time slot IDs 21 to 30 which are set in the damaged time slot list, and the time slot IDs 1 to 5, 6 to 10, 11 to 30, 31 to 40, and 41 to 50 which are set as allocation time slot IDs in the time slot allocation management table, and specifies the unallocated normal time slot IDs. Here, since there are no unallocated normal time slots, the list generation unit 53 generates the unallocated normal time slot ID list {null} (refer to FIG. 11) (step S3).

The list generation unit 53 specifies, among the records in the time slot allocation management table, records that do not contain as an allocation time slot ID, the damaged time slot IDs 21 to 30 which are set in the damaged time slot list. The list generation unit 53 generates the normal logical path ID list {#1, #2, #4, #5} (refer to FIG. 12) in which the logical path IDs read out from the specified records are set (step S4).

The time slot allocation unit 54 reads out the priority of the logical path #3 which is set in the damaged logical path ID list, and the respective priorities of the logical paths #1, #2, #4, and #5 which are set in the normal logical path ID list, from the time slot allocation management table. The priority "low" of the logical paths #2 and #4 is lower than the priority "high" of the logical path #3, and there are no unallocated normal time slots. Consequently, the time slot allocation unit 54 switches the allocation destination time slots of the logical path #3 and the logical paths #2 and #4. Here, among the time slots with IDs 11 to 30 which represent the allocation destination of the logical path #3 set in the damaged logical path ID list, the time slots with IDs 21 to 30 set in the damaged time slot list and the time slots with IDs 21 to 30 which represent the allocation destination of the logical path #4, are switched (step S5). If there are a plurality of normal logical paths having a lower priority than the damaged logical path, the logical path in which switching of the time slots is performed may be selected such that the number of logical paths affected by the damage is minimized.

In this manner, the transmission frame multiplexing processing control unit 15 switches the allocation destination time slots such that logical path traffic with a priority "low" is mapped to the damaged time slots, and updates the time slot allocation management table as shown in the diagram presented on the upper right of FIG. 14. The diagram presented on the lower right of FIG. 14 shows the transmission frames after time slot reallocation. In this manner, in a case where there are no empty time slots, the transmission frame multiplexing processing control unit 15 performs reallocation such that logical paths with a lower priority are allocated to the time slots affected by the damage.

Next, the second reallocation process is described with reference to FIG. 15. FIG. 15 is a diagram showing a mapping process of logical path traffic to time slots. Firstly, as an initial state, the time slot allocation unit 54 performs a time slot allocation process with respect to the 500 Gbps optical channel #1 by packing the logical paths #1 to #5 in order from the lowest number time slot, and the like. Then, the time slot allocation unit 54 generates the time slot allocation management table of the initial state presented in the diagram shown on the upper left in FIG. 15, and registers it in the time slot allocation management table storage unit. The diagram displayed on the lower left in FIG. 15 shows the time slot allocation of the logical paths #1 to #5 in an initial state. The time slots are specified by IDs of 1 to 50.

The damage information reception unit 52 of the transmission frame multiplexing processing control unit 15 acquires the damaged time slot list {21, 22, 23, 24, 25, 26, 27, 28, 29, 30} (step S1).

The list generation unit 53 specifies a record in which a damaged time slot ID listed in the damaged time slot list has been set to the allocation time slot ID in the time slot allocation management table. The list generation unit 53 generates the damaged logical path ID list {#3} in which the logical path ID read out from the specified record is set (step S2).

The list generation unit 53 removes from all time slot IDs 1 to 50, the time slot IDs 21 to 30 which are set in the damaged time slot list, and the time slot IDs 1, 2, 11 to 30, 31 to 40, and 41 to 45 which are set as allocation time slot IDs in the time slot allocation management table, and specifies the unallocated normal time slot IDs. The list generation unit 53 generates the unallocated normal time slot ID list {3, 4, ..., 10, 46, ..., 50} in which the specified unallocated normal time slot IDs are set (step S3).

The list generation unit 53 specifies, among the records in the time slot allocation management table, records that do not contain as an allocation time slot ID, the damaged time slot IDs 21 to 30 which are set in the damaged time slot list. The list generation unit 53 generates the normal logical path ID list {#1, #2, #4, #5} in which the logical path IDs read out from the specified records are set (step S4).

The time slot allocation unit 54 reads out the priority of the logical path #3 which is set in the damaged logical path ID list, and the respective priorities of the logical paths #1, #2, #4, and #5 which are set in the normal logical path ID list, from the time slot allocation management table. The priority "low" of the logical paths #2 and #4 is lower than the priority "high" of the logical path #3, and the unallocated normal time slot ID list is not null. Therefore, the time slot allocation unit 54 changes, among the time slots with IDs 11 to 30 which represent the allocation destination of the logical path #3 set in the damaged logical path ID list, the time slots with IDs 21 to 30 set in the damaged time slot list, to the time slots with IDs 3 to 10, and 46 to 47 included in the unallocated normal time slot ID list (step S5).

In the manner mentioned above, the transmission frame multiplexing processing control unit 15 switches the mapping such that logical path traffic is not mapped to the time slots, and changes the time slot allocation management table as presented in the diagram shown on the upper right of FIG. 15. The diagram presented on the lower right of FIG. 15 shows the transmission frames after time slot reallocation. In this manner, in a case where empty slots exist, the transmission frame multiplexing processing control unit 15 makes use of the empty slots to perform reallocation such that traffic interruptions are avoided as much as possible.

Next, the second reallocation process in a case where a time slot set as unusable exists, is described with reference to FIG. 16.

In the diagrams shown on the lower left and the lower right of FIG. 16, the time slots with IDs 9, 10, 19, 20, 29, 30, 39, 40, 49, and 50 are time slots included in an unusable region, that is to say, time slots that are set as unusable (indicated by a symbol combining a circular symbol and a diagonal line).

FIG. 16 is a diagram showing a mapping process of logical path traffic to time slots. Firstly, as an initial state, the time slot allocation unit 54 performs a time slot allocation process with respect to the 500 Gbps optical channel #1 by packing the logical paths #1 to #5 in order from the lowest number time slot, and the like. Then, the time slot allocation unit 54 generates the time slot allocation management table of the initial state presented in the diagram shown on the upper left in FIG. 16, and registers it in the time slot allocation management table storage unit. The diagram displayed on the lower left in FIG. 16 shows the time slot allocation of the logical paths #1 to #5 in an initial state. The time slots are specified by IDs of 1 to 50.

The damage information reception unit 52 of the transmission frame multiplexing processing control unit 15 acquires the damaged time slot list {21, 22, 23, 24, 25, 26, 27, 28, 29, 30} (step S1).

The list generation unit 53 specifies a record in which a damaged time slot ID listed in the damaged time slot list has been set to the allocation time slot ID in the time slot allocation management table. The list generation unit 53 generates the damaged logical path ID list {#3} in which the logical path ID read out from the specified record is set (step S2).

The list generation unit 53 removes from all time slot IDs 1 to 50, the time slot IDs 21 to 30 which are set in the damaged time slot list, the time slot IDs 1, 2, 11 to 18, 21 to 28, 31 to 38, and 41 to 46 which are set as allocation time slot IDs in the time slot allocation management table, and the time slot IDs 9, 10, 19, 20, 29, 30, 39, 40, 49, and 50 which are set as unusable, and specifies the unallocated normal time slot IDs. The list generation unit 53 generates the unallocated normal time slot ID list {3, ..., 8, 47, 48} in which the specified unallocated normal time slot IDs are set (step S3).

The list generation unit 53 specifies, among the records in the time slot allocation management table, records that do not contain as an allocation time slot ID, the damaged time slot IDs 21 to 30 which are set in the damaged time slot list. The list generation unit 53 generates the normal logical path ID list {#1, #2, #4, #5} in which the logical path IDs read out from the specified records are set (step S4).

The time slot allocation unit 54 reads out the priority of the logical path #3 which is set in the damaged logical path ID list, and the respective priorities of the logical paths #1, #2, #4, and #5 which are set in the normal logical path ID list, from the time slot allocation management table. The priority "low" of the logical paths #2 and #4 is lower than the priority "high" of the logical path #3, and the unallocated normal time slot ID list is not null. Therefore, the time slot allocation unit 54 changes, among the time slots with IDs 11 to 18, 21 to 28, and 31 to 34 which represent the allocation destination of the logical path #3 set in the damaged logical path ID list, the time slots with IDs 21 to 28 set in the damaged time slot list, to the time slots with IDs 3 to 8, 47, and 48 included in the unallocated normal time slot ID list (step S5).

In the manner mentioned above, the transmission frame multiplexing processing control unit 15 switches the mapping such that logical path traffic is not mapped to the time slots, and changes the time slot allocation management table as presented in the diagram shown on the upper right of FIG. 16. The diagram presented on the lower right of FIG. 16 shows the transmission frames after time slot reallocation. In this manner, in a case where empty slots exist, the transmission frame multiplexing processing control unit 15 makes use of the empty slots to perform reallocation such that traffic interruptions are avoided as much as possible.

In the embodiment described above, an example was described for a case where the priority has the two levels of "high" and "low". However, the present embodiment is in no way limited to such a case. The priority may have three or more levels. For example, the priority may be made a multivalued setting represented by a value of "0" to "7". In the first reallocation process, in a case where a normal logical path with a lower priority than the damaged logical path exists, the time slot allocation unit 54 performs reallocation of time slots such that the time slot representing the allocation destination of the low-priority normal logical path and the time slot representing the allocation destination of the damaged logical path, are switched. At this time, in a case where a plurality of normal logical paths with a lower priority than the damaged logical path exist, the time slot allocation unit 54 may select the normal logical path in which switching of the allocation destination time slot with the damaged logical path is performed, based on the priority. For example, the time slot allocation unit 54 may select the normal logical path in which switching of the allocation destination time slot with the damaged logical path is performed, with priority from the path having the lowest priority.

In the embodiment mentioned above, the transmission frame multiplexing processing control unit 15 performs reallocation processing at the time damage occurs to the optical wavelength. However, the embodiment of the present invention is in no way limited to such a case. Reallocation processing corresponding to all optical wavelength damage patterns may be performed beforehand. When damage actually occurs to the optical wavelength, the transmission frame multiplexing processing control unit 15 transmits allocation information of the logical paths to the time slots calculated with respect to the damage pattern corresponding to the occurred damage thereof, to the transmission frame multiplexing processing unit 12 and the transmission frame demultiplexing processing control unit 25.

In the embodiment mentioned above, a case using an OTUCn frame configured in 100 G units as a transmission frame was described. However, the embodiment of the present invention is in no way limited to such a case. An OTUCn-M frame may be used as a transmission frame. In OTUCn-M, a standard for a client signal less than 100 G whose band may be modified in 5 gigabits per second units is set. For example, in the case of "M=60", "5×60" gives a transmission rate of 300 gigabits per second.

As described above, the transmission side framer that configures the optical channel transmission system allocates logical paths each having a transmission priority to the time slots of the optical channel, according to the logical path band. The respective time slots correspond to one of the respective optical wavelengths of the plurality of optical subcarriers used in the multicarrier transmission. In a case where damage occurs to an optical wavelength, the transmission side framer detects the time slots that are affected by the damage thereof, and generates a damaged time slot list which represents a list of the detected time slots. The transmission side framer generates a damaged logical path ID list which represents a list of logical paths allocated to a time slot included in the damaged time slot list. Further, the transmission side framer generates an unallocated normal time slot ID list which represents, among the time slots not included in the time slot list, a list of time slots that are not allocated with a logical path. The transmission side framer generates a normal logical path ID list which represents a list of logical path IDs to which time slots included in the damaged time slot list are not allocated. Further, the transmission side framer executes either a process (1) or a process (2) described below.

Process (1): In a case where a logical path with a lower transmission priority than a logical path included in the damaged logical path ID list is included in the normal logical path ID list, time slot reallocation is performed such that the time slots representing the allocation destination of the low-transmission priority logical path and the time slots representing the allocation destination of the logical path, which is allocated to a damaged time slot, are switched.

Process (2): In a case where a logical path with a lower transmission priority than a logical path included in the damaged logical path ID list is included in the normal logical path ID list, time slot reallocation is performed such that the time slots representing the allocation destination of the low-transmission priority logical path, the time slots representing the allocation destination of the logical path which is allocated to a damaged time slot, and time slots included in the unallocated normal time slot ID list, are switched between the three.

Consequently, at the time of damage to a portion of the optical wavelengths or a physical port that transmits an optical channel, allocation of the logical paths to the time slots of the optical channel can be dynamically changed such that the time slots corresponding to the optical wavelength in which damage occurred are avoided and the time slots are allocated to logical paths having a high priority, and transmission can be performed according to the transmission priority of the logical paths.

In the conventional technique, in an optical transmission device that divides an optical channel into a plurality of time slots and performs transmission by dividing the optical channel in which a plurality of logical paths are multiplexed by allocating the logical paths each having a transmission priority to the time slots according to the band of the logical path thereof, into a plurality of optical wavelengths or physical ports, at the time of damage to a portion of the optical wavelengths or a physical port that transmits the optical channel, an interruption occurred in the traffic passing through the damaged optical wavelength or physical port. Consequently, at the time of damage to a portion of the optical wavelengths or a physical port that transmits an optical channel, transmission according to the transmission priority of the logical paths could not be performed.

According to the embodiment described above, at the time of damage to a portion of the optical wavelengths or a physical port that transmits an optical channel, the framer in the optical transmission device restores the logical path traffic by changing the mapping of the logical paths in a case where the optical channel has an empty band. Furthermore, in a case where the optical channel does not have an empty band, it becomes possible to perform transmission according to the transmission priority of the logical paths.

The transmission frame transmission damage monitoring unit 14, the transmission frame multiplexing processing control unit 15, the transmission frame reception damage monitoring unit 24, and the transmission frame demultiplexing processing control unit 25 in the embodiment mentioned above may be realized by a computer. In this case, a program for realizing the functions may be realized by recording the program on a computer-readable recording medium, reading the program recorded on the recording medium into a computer system, and then executing it. The "computer system" referred to here may include an OS (operating system) and hardware such as peripheral devices. Furthermore, the "computer-readable recording medium" refers to a portable medium such as a flexible disk, a magnetic optical disk, a ROM, or a CD-ROM, or a recording device such as a hard disk that is built into the computer system. Further, the "computer-readable recording medium" may include those that dynamically retain the program for a short time, such as a communication line in a case where the program is transmitted via a network such as the Internet, or a communication line such as a telephone line, and in this case, those that retain the program for a fixed time, such as a volatile memory within computer systems that become the server and the client. Moreover, the program described above may be one for realizing a portion of the functionality mentioned above. Further, it may be one that realizes the functionality mentioned above in a combination with a program already stored on the computer system, and may also be one that is realized by using hardware such as a PLD (Programmable Logic Device) or a FPGA (Field Programmable Gate Array).

The foregoing has described in detail the embodiments of the invention with reference to the drawings. However, specific configurations are in no way limited to the embodiments, and include designs, and the like, without departing from the scope of the invention.

INDUSTRIAL APPLICABILITY

The present invention is applicable to high-capacity optical transmission.

REFERENCE SYMBOLS

1 Optical transmission device
2 Optical transmission device
3 Transmission path
10 Transmission unit
20 Reception unit
11-1 to 11-4 Client signal reception unit
12 Transmission frame multiplexing processing unit
13 Transmission frame transmission unit
14 Transmission frame transmission damage monitoring unit
15 Transmission frame multiplexing processing control unit
21 Transmission frame reception unit
22 Transmission frame demultiplexing processing unit
23-1 to 23-4 Client signal transmission unit
24 Transmission frame reception damage monitoring unit
25 Transmission frame demultiplexing processing control unit
51 Time slot allocation management table storage unit
52 Damage information reception unit
53 List generation unit
54 Time slot allocation unit
55 Allocation information transmission unit
110 Transmission processing unit
120 Client signal reception unit
121 Reception unit
122 Mapping unit
123 OH processing unit
130 Multiplexing processing unit
131 Multiplexing unit
132 Framing unit
140 Line side transmission processing unit
141 Interleaving unit
142-1, 142-2, 142-3, 142-4 OH processing unit
143-1, 143-2, 143-3,143-4 Multilane transmission unit
150 Reception processing unit
160 Line side reception processing unit
161-1, 161-2, 161-3, 161-4 Multilane reception unit
162-1, 162-2, 162-3, 162-4 OH processing unit
163 Deinterleaving unit
170 Separation processing unit
171 Deframing unit
172 Demultiplexing unit
180 Client signal transmission unit
181 OH processing unit
182 Demapping unit
183 Transmission unit
210 ODU-SW
220 Transmitter
230 Receiver
800 OTN framer

The invention claimed is:

1. A framer in a transmission device, wherein the transmission device allocates a plurality of logical paths each having a transmission priority to a plurality of time slots of an optical channel, allocates a plurality of client signals received by the plurality of logical paths to the plurality of time slots to which the plurality of logical paths is allocated, and transmits the plurality of client signals by a plurality of optical subcarriers that use a plurality of optical wavelengths corresponding to the plurality of time slots, the framer comprising:
at least one memory storing instructions, and
at least one processor configured to execute the instructions to allocating, in a case where damage has occurred to an optical wavelength corresponding to a time slot to which a logical path having a high transmission priority is allocated, the logical path having the high transmission priority to at least one of the plurality of time slots while a damaged time slot which is the time slot corresponding to the optical wavelength to which the damage has occurred is avoided, to change the time slot to which the logical path having the high transmission priority is allocated,
wherein the at least one processor is configured to execute the instructions to reallocate time slots such that allocation destination time slots are switched between: a damaged logical path which is the logical path allocated to the damaged time slot; and a logical path which has a lower transmission priority than that of the damaged logical path and which is allocated to a time slot corresponding to a normal optical wavelength among the plurality of optical wavelengths.

2. The framer according to claim 1, wherein the at least one processor is configured to execute the instructions to:
change an allocation destination of the damaged logical path to an unallocated normal time slot which is a time slot corresponding to a normal optical wavelength among the plurality of optical wavelengths and to which a logical path is not allocated; and
reallocates time slots such that the damaged time slot to which the damaged logical path whose allocation destination could not be changed to the unallocated normal time slot is allocated, and a time slot which is an allocation destination of a logical path which has a lower transmission priority than that of the damaged logical path and which is allocated to a time slot corresponding to a normal optical wavelength among the plurality of optical wavelengths are switched, in a case where all of an allocation destination of the damaged time slot could not be changed to the unallocated normal time slot.

3. The framer according to claim 1, wherein the at least one processor is configured to execute the instructions to change an allocation destination of the damaged logical path, to a time slot which corresponds to a normal optical wavelength among the plurality of optical wavelengths and to which a logical path is not allocated.

4. The framer according to claim 1, wherein the at least one processor is configured to execute the instructions to change an allocation destination of the damaged logical path, to a time slot which corresponds to a normal optical wavelength among the plurality of optical wavelengths, to which a logical path is not allocated and which is not set as unusable.

5. A framing method performed by a framer in a transmission device, wherein the transmission device allocates a plurality of logical paths each having a transmission priority to a plurality of time slots of an optical channel, allocates a plurality of client signals received by the plurality of logical paths to the plurality of time slots to which the plurality of logical paths is allocated, and transmits the plurality of client signals by a plurality of optical subcarriers that use a plurality of optical wavelengths corresponding to the plurality of time slots, the framing method comprising:

a time slot allocation step of, in a case where damage has occurred to an optical wavelength corresponding to a time slot to which a logical path having a high transmission priority is allocated, allocating the logical path having the high transmission priority to at least one of the plurality of time slots while a damaged time slot which is the time slot corresponding to the optical wavelength to which the damage has occurred is avoided, to change the time slot to which the logical path having the high transmission priority is allocated, wherein the time slot allocation step includes reallocating time slots such that allocation destination time slots are switched between: a damaged logical path which is the logical path allocated to the damaged time slot; and a logical path which has a lower transmission priority than that of the damaged logical path and which is allocated to a time slot corresponding to a normal optical wavelength among the plurality of optical wavelengths.

6. The framer method according to claim 5, wherein the time slot allocation step includes:

changing an allocation destination of the damaged logical path to an unallocated normal time slot which is a time slot corresponding to a normal optical wavelength among the plurality of optical wavelengths and to which a logical path is not allocated; and reallocating time slots such that the damaged time slot to which the damaged logical path whose allocation destination could not be changed to the unallocated normal time slot is allocated, and a time slot which is an allocation destination of a logical path which has a lower transmission priority than that of the damaged logical path and which is allocated to a time slot corresponding to a normal optical wavelength among the plurality of optical wavelengths are switched, in a case where all of an allocation destination of the damaged time slot could not be changed to the unallocated normal time slot.

7. The framer method according to claim 5, wherein the time slot allocation step includes changing an allocation destination of the damaged logical path, to a time slot which corresponds to a normal optical wavelength among the plurality of optical wavelengths and to which a logical path is not allocated.

8. The framer method according to claim 5, wherein the time slot allocation step includes changing an allocation destination of the damaged logical path, to a time slot which corresponds to a normal optical wavelength among the plurality of optical wavelengths, to which a logical path is not allocated and which is not set as unusable.

* * * * *